US006371564B1

(12) United States Patent
Yates et al.

(10) Patent No.: US 6,371,564 B1
(45) Date of Patent: Apr. 16, 2002

(54) METHOD AND SYSTEM FOR REMOVING MATTER FROM A PICKUP TRUCK

(76) Inventors: Mike Yates, 18 King Ave., Stanwood, IA (US) 52337; Dick Behnken, 4610 Sherry La., Marion, IA (US) 52302

( * ) Notice: Subject to any disclaimer, the term of this patent is extended or adjusted under 35 U.S.C. 154(b) by 0 days.

(21) Appl. No.: 09/572,631

(22) Filed: May 17, 2000

(51) Int. Cl.[7] .................................................. B60P 1/64

(52) U.S. Cl. .......................... 298/1 A; 298/12; 298/14; 296/35.3; 296/184

(58) Field of Search .......................... 298/1 A, 12, 14, 298/22 P; 296/35.3, 184; 414/475, 477, 478

(56) References Cited

U.S. PATENT DOCUMENTS

| | | | | | |
|---|---|---|---|---|---|
| 460,871 | A | * | 10/1891 | Hill | 298/12 |
| 577,913 | A | * | 3/1897 | Chrissinger | 298/14 |
| 595,056 | A | * | 12/1897 | French | 298/12 |
| 1,533,419 | A | * | 4/1925 | Hug | 298/12 |
| 1,712,398 | A | * | 5/1929 | Palmero et al. | 298/12 |
| RE17,497 | E | * | 11/1929 | Robinson | 298/12 |
| 3,147,999 | A | * | 9/1964 | Daniels | 298/1 A |
| 3,411,825 | A | | 11/1968 | Fulton | |
| 3,446,534 | A | | 5/1969 | King | |
| 3,471,045 | A | | 10/1969 | Panciocco | |
| 3,630,571 | A | | 12/1971 | Saldana | 298/14 |
| 3,740,097 | A | | 6/1973 | Parker et al. | 298/1 A |
| 3,833,261 | A | * | 9/1974 | Dingler | 298/1 A |
| 3,871,706 | A | | 3/1975 | Odom | 298/1 A |
| 3,915,496 | A | | 10/1975 | Mabry, Jr. | 298/14 |
| 4,647,110 | A | * | 3/1987 | McKee | 298/1 A |
| 4,681,371 | A | | 7/1987 | Leonard | 298/1 A |
| 4,741,575 | A | | 5/1988 | Sloan | 298/12 |
| 5,267,779 | A | | 12/1993 | Talamantez, Jr. et al. | 298/1 A |
| 5,447,361 | A | | 9/1995 | Phillips | 298/1 A |
| 6,196,634 | B1 | * | 3/2001 | Jurinek | 298/1 A |

* cited by examiner

*Primary Examiner*—Stephen T. Gordon
(74) *Attorney, Agent, or Firm*—Simmons, Perrine, Albright & Ellwood, PLC

(57) ABSTRACT

A system for dumping material from a dump box in a pickup truck where the dump box first rolls slightly to the rear so as to clear a bumper or other structure on the rear of the vehicle. Then the dump box lifts via hydraulic side mounted pistons.

11 Claims, 7 Drawing Sheets

METHOD AND SYSTEM FOR REMOVING MATTER FROM A PICKUP TRUCK

FIELD OF THE INVENTION

The present invention generally relates to pickup trucks, and more particularly relates to dump boxes for pickup trucks, and even more particularly relates to methods and systems for efficient removal of matter from a dump box in a pickup truck.

BACKGROUND OF THE INVENTION

In the past, designers of pickup truck dumping accessories have endeavored to assist with dumping of material from pickups.

One example is shown in U.S. Pat. No. 3,471,045 by Panciocco for AUXILIARY EQUIPMENT FOR PICKUP TRUCKS, which shows an elevated box in a rear portion of a pickup truck.

Another example is shown in U.S. Pat. No. 3,630,571 by Saldana for AUXILIARY DUMPING APPARATUS FOR A VEHICLE, which shows a box which rolls out the back of the truck and pivots, at a central point in the box, to hit the ground.

Another example is shown in U.S. Pat. No. 3,411,825 by Fulton for DUMP-BODY ACCESSORY FOR PICK-UP TRUCK, which shows a box which pivots at an end point of the dump box and at the rear of the pickup box.

Yet another example is shown in U.S. Pat. No. 5,447,361 by Phillips for PORTABLE DUMPING INSERT FOR A PICKUP TRUCK, which shows a box which pivots at a point inside the dump box and the pickup box.

While these pickup dump boxes have been used extensively in the past, they do have some drawbacks.

First of all, the '045 patent shows a dump box which has a high profile box which extends significantly above the height of the box of the truck with the attendant high center of gravity and reduced visibility disadvantages associated with a high profile design.

Some of the disadvantages of the '045 design are overcome with the '571 patent. However, it has disadvantages associated with the fact that the maximum dump angle (the angle of the dump box with respect to the truck bed), is limited by contact of the box with the ground.

Some of the disadvantages of the '571 are overcome by the '825 patent, which achieves a higher maximum dump angle than the '571 design. However, the '825 patent has a problem in that it dumps debris on the bumper of the truck.

The '361 patent, with its interior pivot point and angled box rear end, reduces the problems of the '825 patent of dumping onto the bumper, but the size and shape of the box of the '361 patent prohibit the truck from use in hauling very large objects, such as many sheets of 4 feet by 8 feet sheets of plywood etc.

Consequently, there exists a need for improved methods and systems for removing material from a pickup truck dump box in an efficient manner, while concomitantly allowing the vehicle to be used for hauling large 4×8 sheets.

SUMMARY OF THE INVENTION

It is an object of the present invention to provide a system and method for removing matter from a pickup dump box in an efficient manner.

It is a feature of the present invention to include a mechanically assisted, low profile, dump box.

It is another feature of the present invention to include a slight rollback of the box prior to dumping.

It is yet another feature of the present invention to include a box having a 4×8 foot floor for carrying large sheets of plywood, etc.

It is an advantage of the present invention to achieve improved utility in a dump box design.

The present invention is an apparatus and method for dumping material from a box in a pickup truck, designed to satisfy the aforementioned needs, provide the previously stated objects, include the above-listed features, and achieve the already articulated advantages. The present invention is carried out in a "wasted material-less" manner in a sense that the material wasted by remaining in the box due to an insufficient dump angle and the material wasted by dumping on to the truck bumper, etc. has been greatly reduced.

Accordingly, the present invention is a system and method including a low profile, partial roll-out dump box with a full 4×8 foot box floor dimension.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
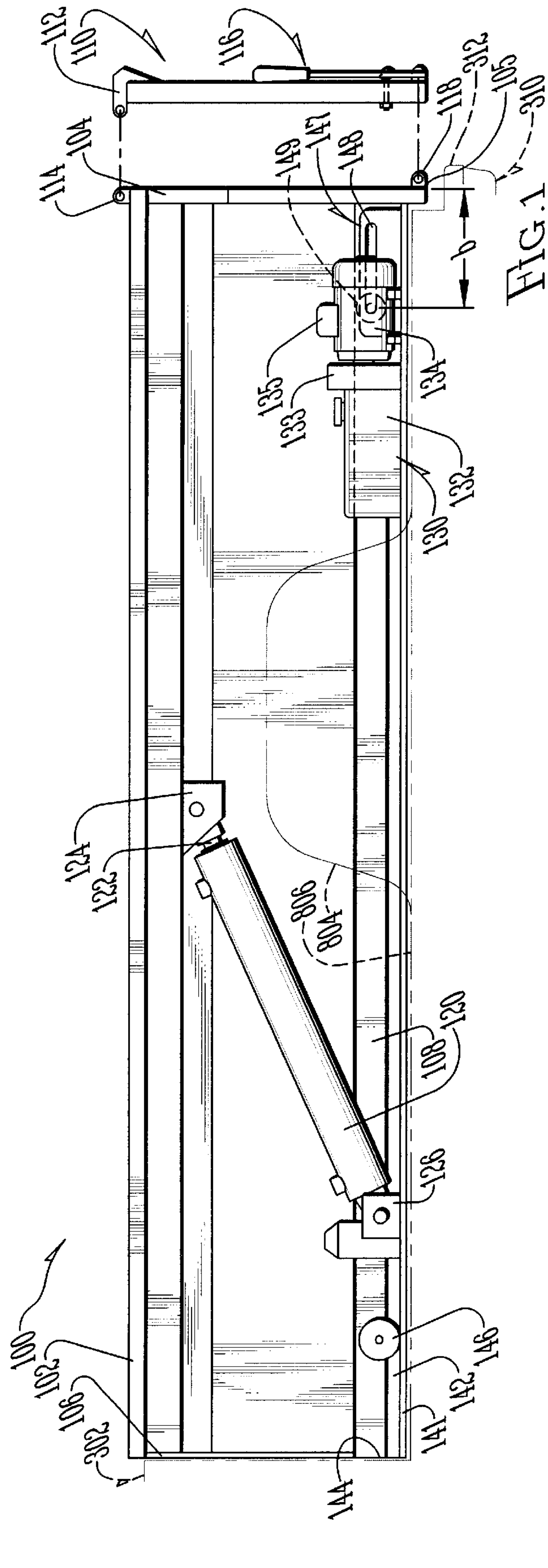
FIG. 1 is an exploded side view of a system of the present invention, shown with the tailgate detached.

Now referring to the drawings wherein like numerals refer to like matter throughout, and more specifically referring to FIG. 1, there is shown a system of the present invention generally designated 100, including a dump box top rail 102, a dump box tailgate end 104, dump box cab end 106, and a dump box bottom 108. Also shown is a dump box tailgate 110 having a dump box tailgate movable hinged member 112 and a dump box tailgate fixed hinge member 114 affixed to the dump box top rail 102. At the bottom edge of dump box tailgate 110 is dump box tailgate bottom movable hinge member 116, which is shown with a handle for assisting in pin removal and insertion. Other hinge mechanism could be used as well.

When a pin is inserted into dump box tailgate movable hinged member 112 and dump box tailgate fixed hinge member 114, then the dump box tailgate 110 is free to pivot about the pin and the dump box tailgate bottom movable hinge member 116 is allowed to float freely, from dump box tailgate bottom fixed hinge member 118. This orientation is used during dumping. When the pins are switched and the dump box tailgate movable hinged member 112 is not pinned and the dump box tailgate bottom movable hinge member 116 is, then the dump box tailgate 110 can pivot downward in a fashion like a typical pickup tailgate.

Also shown is a hydraulic cylinder 120 having an extendable piston 122 therein for coupling with pivoting top box joint 124. At the opposite end of hydraulic cylinder 120 is a pivoting frame/bed joint 126 attached to the frame of the dump box apparatus 100. The hydraulic cylinder 120 is used to pivot the box 100 upward to allow dumping. Hydraulic supply source 130 includes a hydraulic sump 132, pump 133, and a pump electric motor 134 and a motor control solenoid 135, which are coupled to the cylinder via hoses (not shown). Hydraulic supply 130 is preferably coupled to some electric controller, (not shown) which is either remotely controlled from the cab of the pickup truck 302 or through control switches located on or about the dump box 100. The details of the electric or other controls for hydraulic supply source 130 are believed to be a matter of designer's choice and are well known in the art. Hydraulic supply source 130 is preferably mounted on a dump box base frame 141, which provides structural support for the various parts of dump box 100 and mates with the pickup truck bed 806 (FIG. 8) of the pickup truck 302 via bolts or similar means. Hydraulic supply source 130 is merely an example of many kinds of mechanical devices which could be used to provide lifting forces. Hand cranks, screw jacks, and countless other known lift devices could be substituted. The hydraulic supply source 130 and hydraulic cylinder 120 are merely a preferred approach, partially because they provide a two-way actuation, both pushing the dump box 100 up and pulling it back down. Dump box base frame 141 has disposed thereon a longitudinal roller rail 142, which cooperate with left side cab roller 146 and left side rear roller 149 which are affixed, at predetermined fixed locations to the box 100. Rollers 146 and 149 are disposed along dump box bottom edge 144 of box 100. Roller 146 is free to roll on longitudinal roller rail 142 and is also free to disengage from the longitudinal roller rail 142 and be lifted upward along with the box 100. Roller 149 is attached along bottom edge 144 a distance "b" from the outside bottom dump box rear edge 105 of box 100. Roller 149 is free to rotate on box 100 and is inserted in roll limiting slot 148 of left side rear roller guide 147. The length of roll limiting slot 148 determines the distance of horizontal travel of the box 100 prior to lifting. Except for the hydraulic supply source 130 and its components, a view of the opposite (right) side of the dump box 100 would include an identical structure as shown in FIG. 1. Where only one side of the dump box 100 is described herein, it shall be understood that the opposite side is a mirror image of the described side, except the hydraulic supply source 130 and its components, hydraulic sump 132, pump 133, pump electric motor 134, and hydraulic actuation solenoids, are preferably single items and are not duplicated on each side of the present invention.

Figure 2:
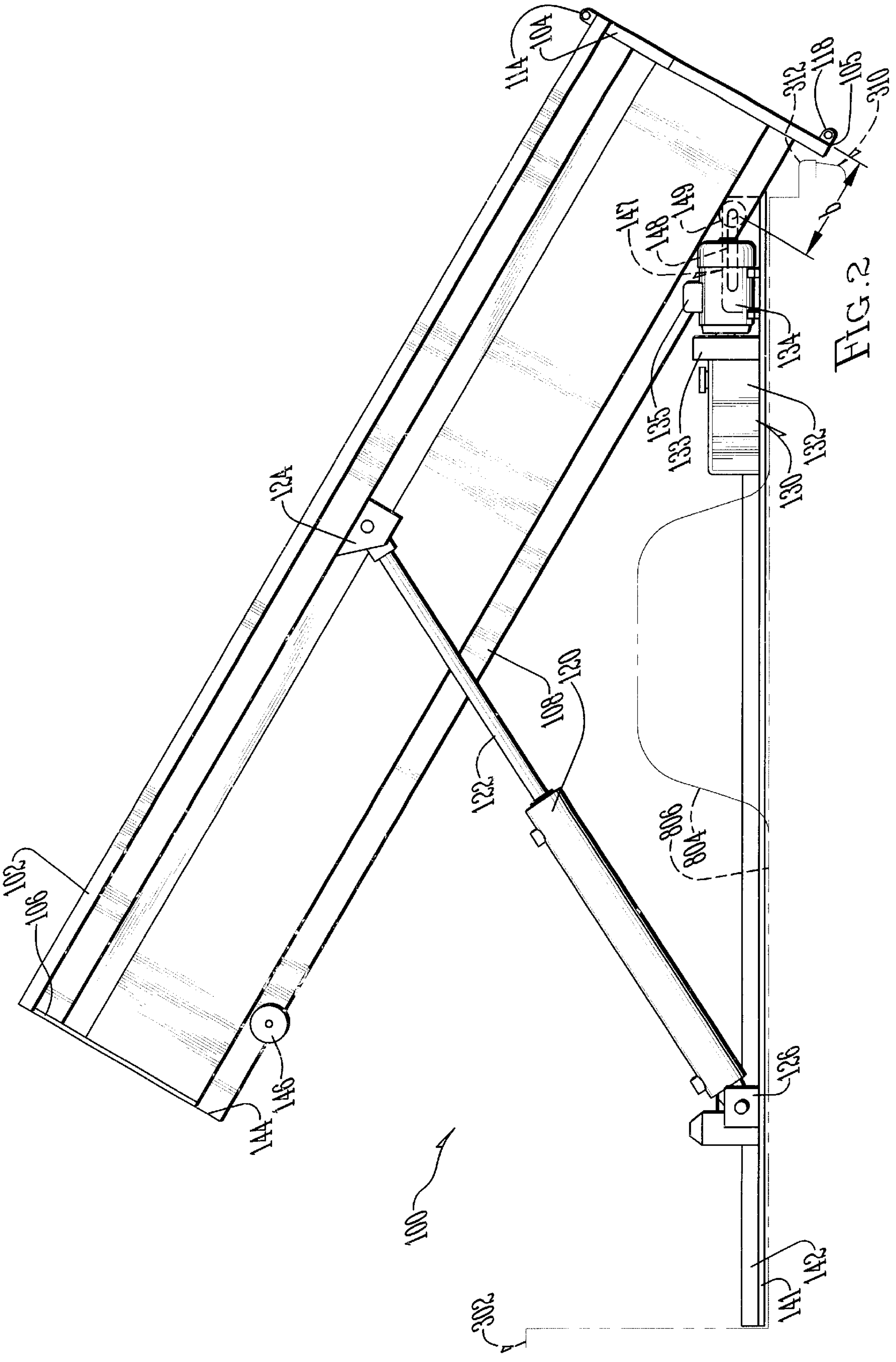
FIG. 2 is a side view of the present invention with the dump box in a partially raised orientation.

A more detailed understanding of the present invention can be achieved by now referring to FIG. 2, which shows the box 100 in a full rearward position and in a partially elevated position. The box 100 has been rolled backward the full length of roll limiting slot 148 and has been subsequently lifted with the hydraulic cylinder 120. The distance "b" in combination with the length of roll limiting slot 148 determine how far the box 100 rolls before dumping occurs. If the pickup truck rear bumper 310 of the vehicle is very large, then these dimensions would need to be correspondingly larger as well.

Longitudinal roller rail 142 is shown as running the entire length of the box 100 and the dump box base frame 141. It is not necessary that the longitudinal roller rail 142 extend through the central portion of the dump box base frame 141; however, it may provide additional structural support and rigidity to the dump box 100, especially during times when it is removed, as a single unit, from the pickup truck 302. While the longitudinal roller rail 142 is preferred, it should be understood that it can be omitted, and the rollers could be allowed to run on the bed of the truck. Other means for permitting the dump box to translate out the rear of the box of the pickup truck are possible and are intended to be included within the scope of the present invention. The rolling of the box could be stopped by something as simple as a stop or barrier place in the path of the rollers.

Figure 3:
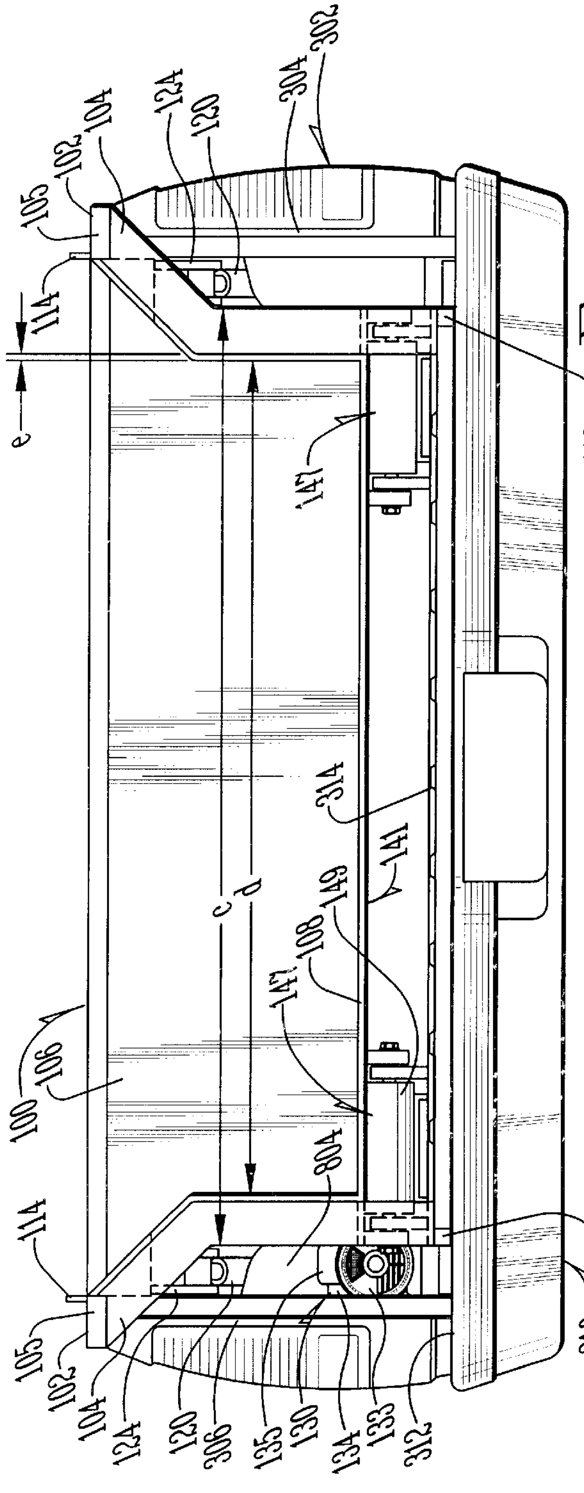
FIG. 3 is an end view of the dump box of the present invention disposed in a box of a pickup truck.

An even more detailed understanding of the present invention may be achieved by now referring to FIG. 3, which shows the box 100 disposed in a box of a pickup truck 302 having a right side pickup truck fender 304, and left side pickup truck fender 306, and a pickup truck rear bumper 310, having a pickup truck rear bumper top outside edge 312. The hydraulic supply 130 is shown disposed between the box 100 and the left side pickup truck fender 306. This is a space which is aft of the left side wheel hump 804 (FIG. 8) inside the box of pickup truck 302. Box 100 is shown having dump box bed ridges 314 therein, which are similar to ridges typically found in the boxes of metal bed pickup trucks. The distance "c" from the outside to the outside of box 100 is preferably the maximum distance permitted and still allow for the dump box 100 to fit between the wheel humps in a standard pickup. The distance "d" inside the dump box 100 is preferably slightly larger than four feet, so as to allow receipt of a 4×8 sheet of building material, such as plywood, etc. The thickness "e" of the wall of the dump box 100 is a matter of designer's choice, but it is believed that a range of 0.063 inches to 0.125 inches is preferred, with a thickness of 0.078 or (14 gauge metal) thought to be most preferred.

Figure 4:
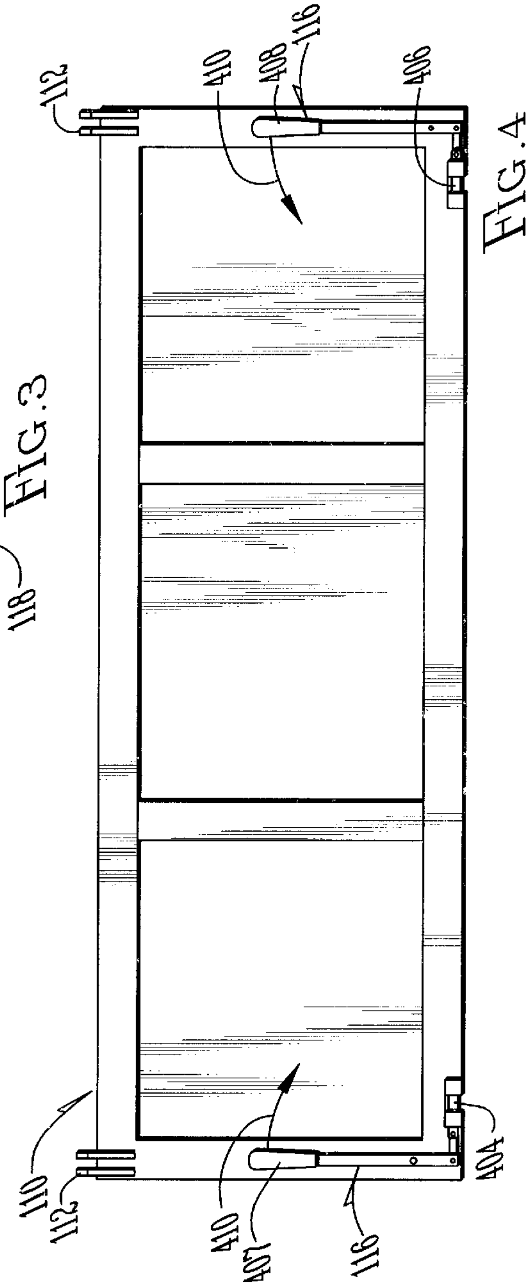
FIG. 4 is an end view of the tailgate of the dump box of the present invention.

Now referring to FIG. 4, there is shown an end view of a dump box tailgate 110, of the present invention. Dump box tailgate 110 includes two dump box tailgate movable hinged members 112 and two dump box tailgate bottom movable hinge members 116, which are shown with dump box tailgate bottom left side hinge handle 407 and dump box tailgate bottom right side hinge handle 408, where the motion of pivoting is shown by lines dump box tail gate bottom hinge handle pivot direction 410. This pivoting of the dump box tailgate bottom left side hinge handle 407 and dump box tailgate bottom right side hinge handle 408 results in a retraction of dump box tailgate bottom left side hinge pin 404 and dump box tailgate bottom right side hinge pin 406 respectively. Dump box tailgate bottom left side hinge pin 404 and dump box tailgate bottom right side hinge pin 406 are for insertion into dump box tailgate bottom fixed hinge member 118. (FIG. 1)

Figure 5:
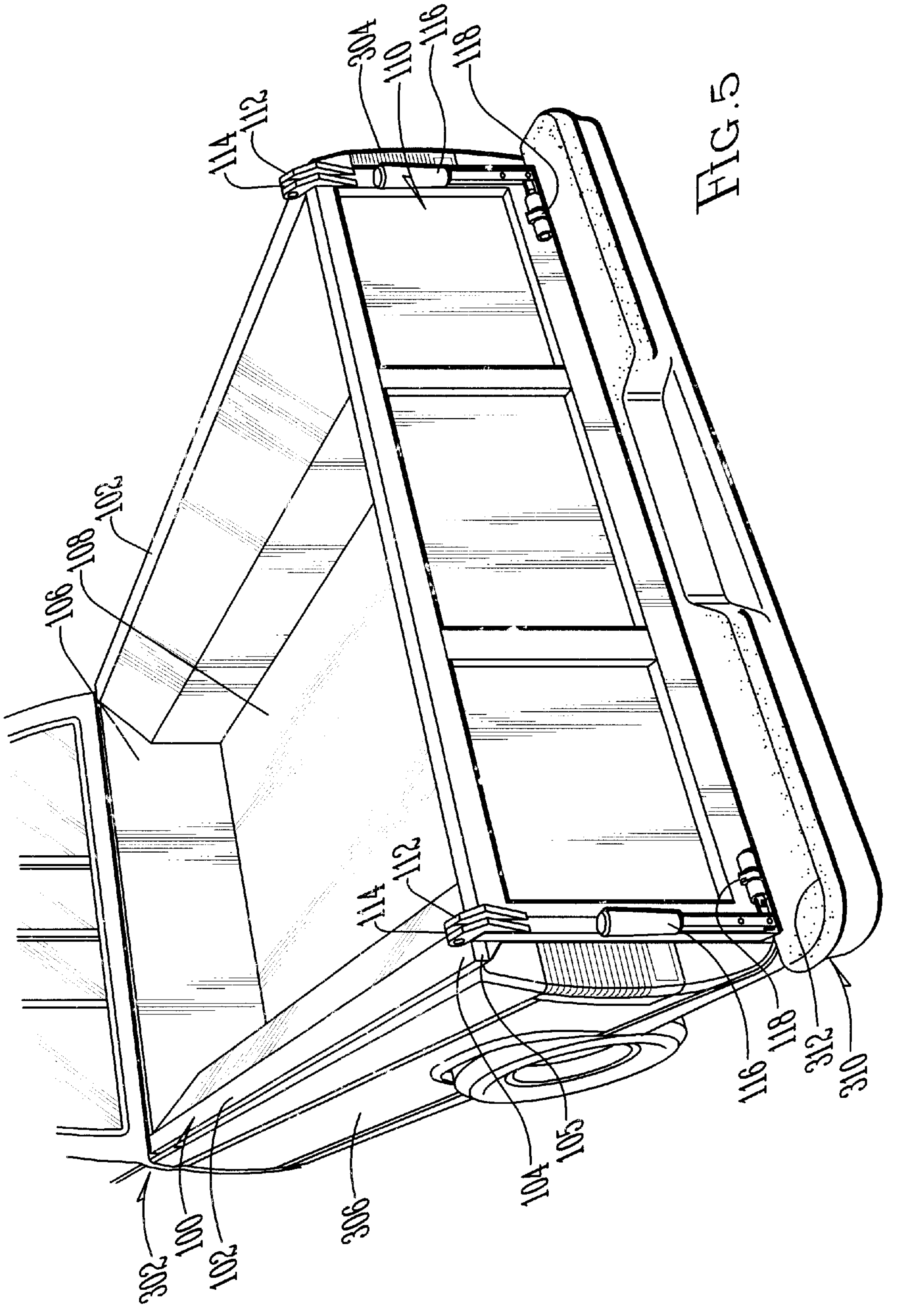
FIG. 5 is a perspective view of the dump box of the present invention shown in a fully seated position.

Now referring to FIG. 5, there is shown a dump box 100 of the present invention in a fully seated position within the box of pickup truck 302. The dump box tailgate 110 is flush with the rear of the vehicle. The bottom dump box rear edge 105 is shown disposed inward of the pickup truck rear bumper top outside edge 312 of the pickup truck rear bumper 310. This is the position of the box 100 during normal operation of the pickup truck 302 while it is being driven down the road.

Figure 6:
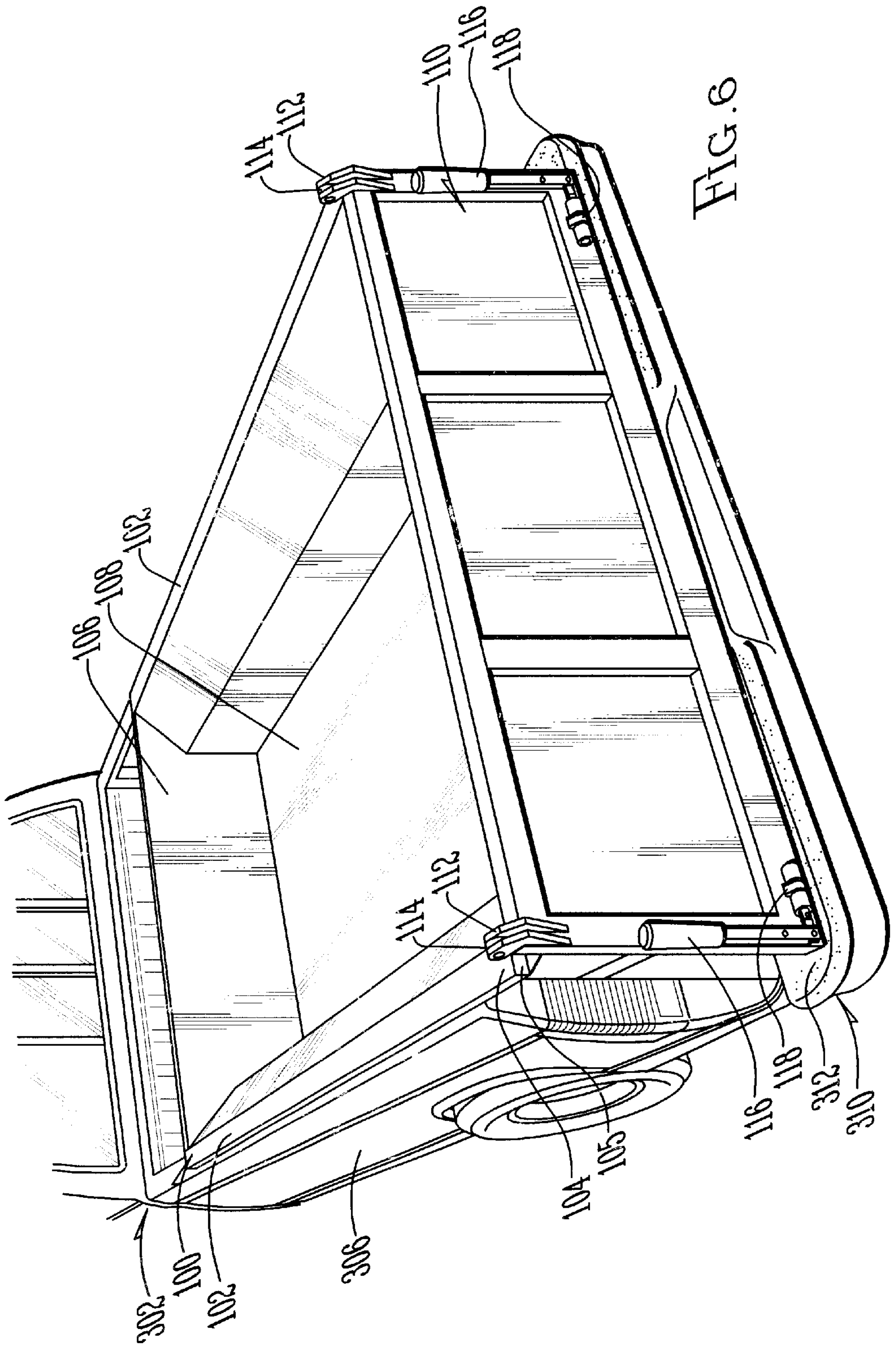
FIG. 6 is a perspective view of the dump box of the present invention in an intermediate stage during the dumping process with the dump box in a bumper clearing position.

Now referring to FIG. 6, there is shown a perspective view of the box 100, in an intermediate position during the dumping process. Box 100 has been rolled, or otherwise caused to translate horizontally, so that the bottom dump box rear edge 105 of the box 100 extends beyond the rear of the vehicle and extends at least to the pickup truck rear bumper top outside edge 312 of the pickup truck rear bumper 310.

Figure 7:
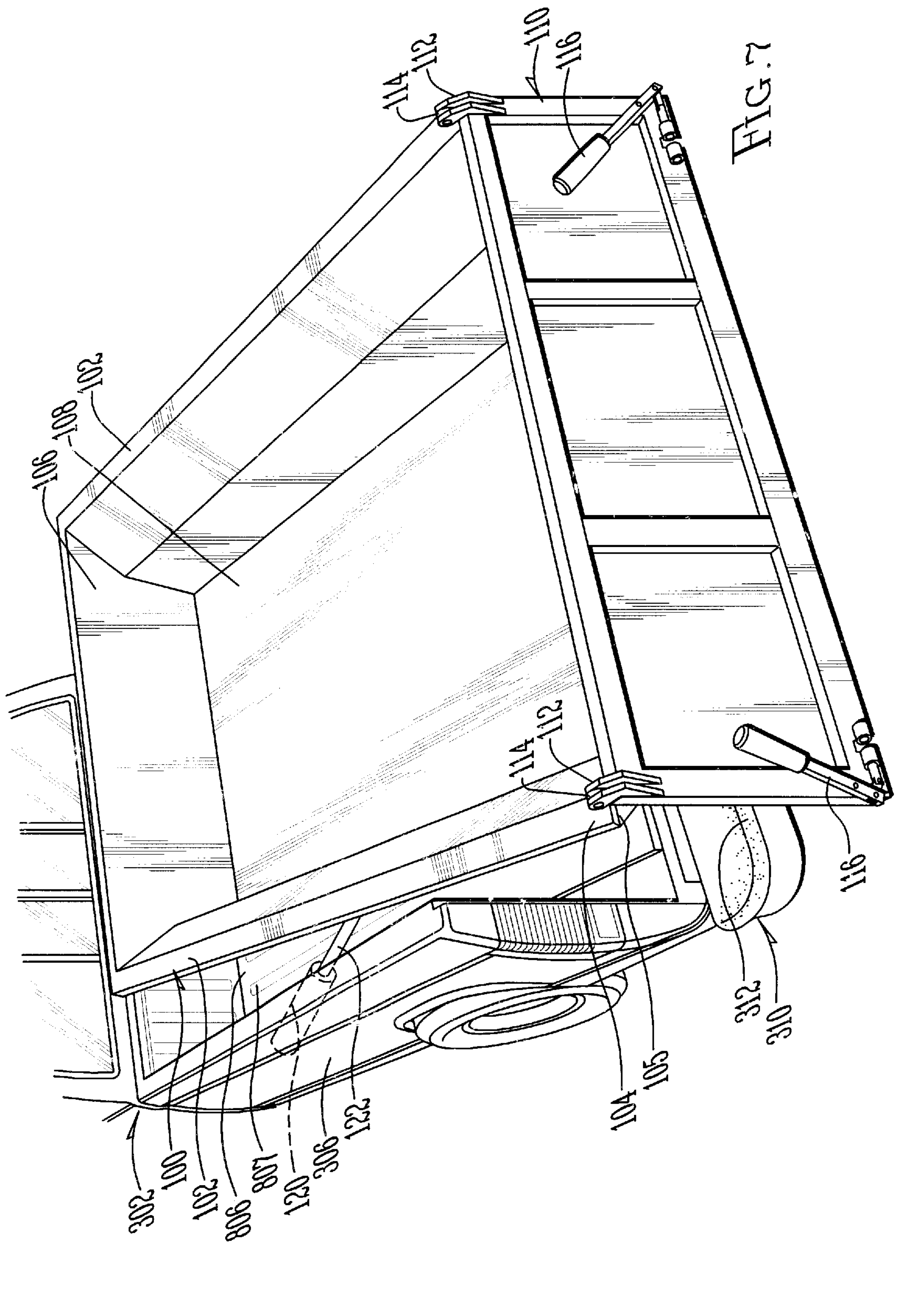
FIG. 7 is a perspective view of the dump box of the present invention, disposed in a pickup truck box, where the dump box is shown in a partially raised position.

Now referring to FIG. 7, there is shown a perspective view of the box 100 of the present invention, with the box in a partially raised position for dumping. The dump box tailgate 110 has been configured for dumping, and the bottom hinges have had the pins removed to allow for free movement.

Figure 8:
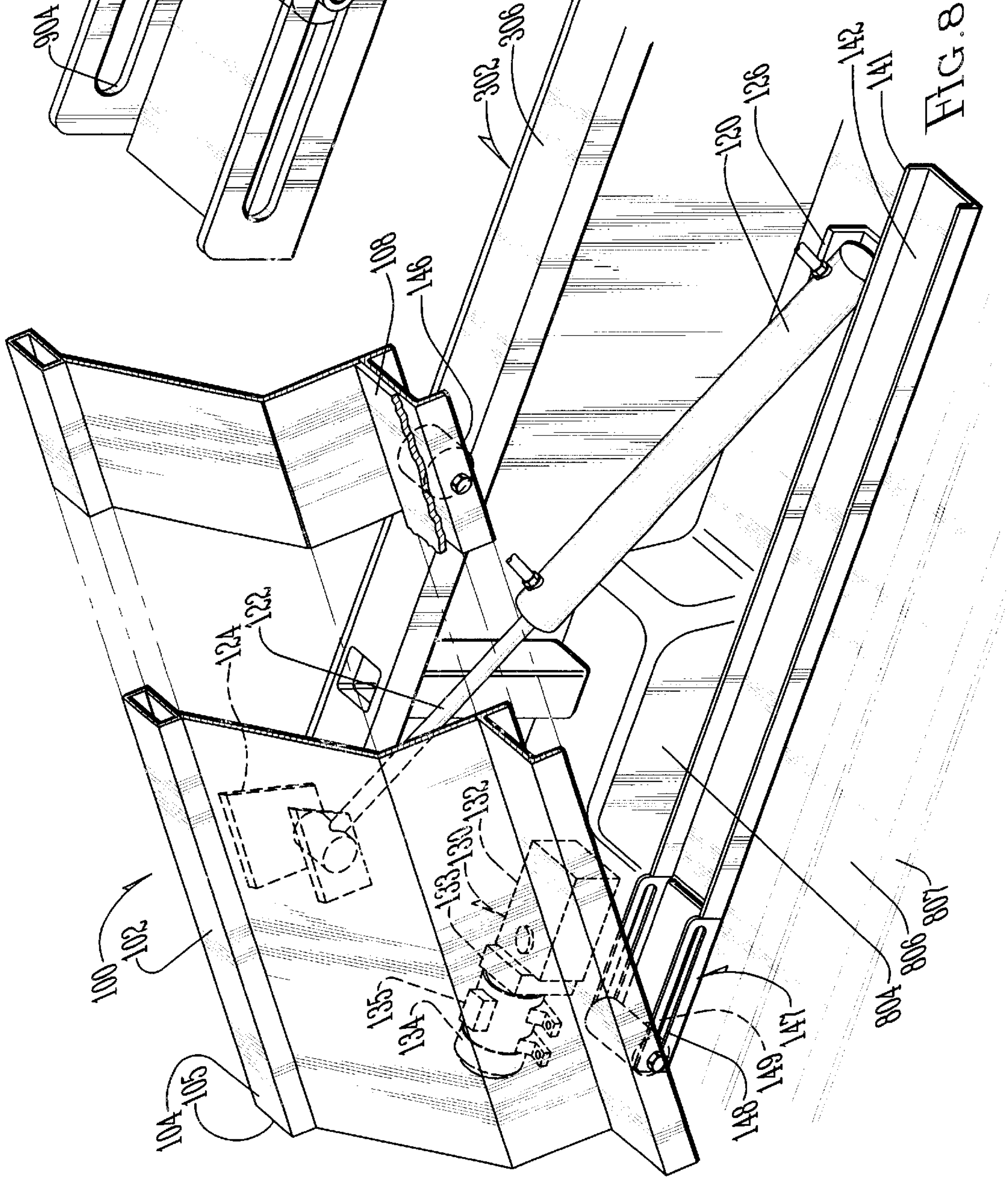
FIG. 8 is a view of underside portions of the dump box of the present invention, together with other structure disposed inside of a pickup box.

Now referring to FIG. 8, there is shown a perspective view of an underside of the box 100, when it is in an elevated position. Left side wheel hump 804 is shown disposed immediately adjacent to dump box base frame 141 and longitudinal roller rail 142. A hydraulic sump 132 is shown disposed between left side wheel hump 804 and pump electric motor 134. The pickup truck bed 806 of pickup 302 is shown having a plurality of pickup truck bed ridges 807 frequently found in metal pickup beds.

Figure 9:
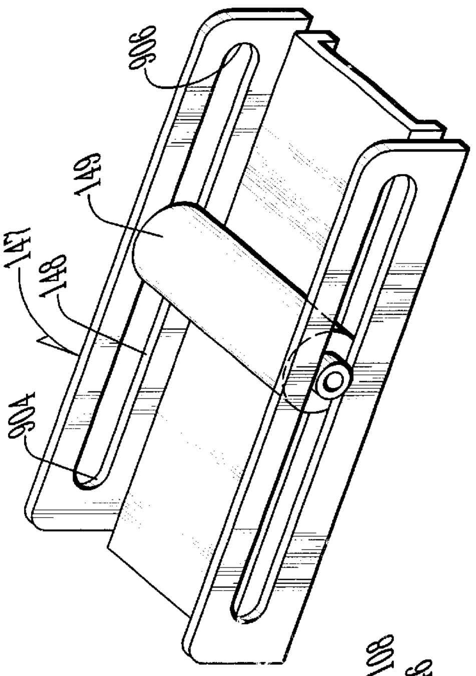
FIG. 9 is a perspective view of a portion of the present invention showing the rear pivoting mechanism.

Now referring to FIG. 9, there is shown an enlarged portion of the end of rail 142, left side rear roller guide 147 with the roller 149 disposed in roll limiting slot 148. Roll limiting slot 148 is shown with dump box rearward roll limiting stop 904 and dump box forward roll limiting stop 906. Not shown is the body of the dump box 100, which would be affixed at a predetermined location to the roller 149. The separation of dump box rearward roll limiting stop 904 and dump box forward roll limiting stop 906 is an important dimension in the present invention. If the separation is too small, then the load may be dumped upon the bumper or trailer hitch of the pickup truck 302. If the separation is too large, then the box may contact the ground before the hydraulic pistons are fully extended, thereby limiting the maximum dump angle of the dump box. In a preferred embodiment, the separation would be large enough to allow the box to extend beyond any bumper or trailer hitch, and shorter than the height of the pickup truck bed 806 above the ground.

In operation, the apparatus and method of the present invention as described in FIGS. 1–9, could function as follows: Material is dumped into the dump box 100. A remote electrical switch (not shown), coupled to hydraulic supply 130, via a motor control solenoid, is actuated in a first direction, thereby causing extendable piston 122 to extend from the hydraulic cylinder 120. (Note: It should be understood that the hydraulic cylinder 120 is a two-way device, so that an actuation of the remote electrical switch in another direction could be used to pull the dump box 100 back.) This causes the dump box 100 to roll, on rollers 149 and 146 until left side rear roller 149 reaches dump box rearward roll limiting stop 904 of roll limiting slot 148. At this point, no further rolling translation of the box 100 is possible along the longitudinal roller rail 142. Further elongation of the extendable piston 122 will then result in a lifting, via pivoting, of the dump box 100 around an axis formed by the left side rear roller 149 at the dump box rearward roll limiting stop 904 of the roll limiting slot 148. The bottom dump box rear edge 105, of the dump box 100 has moved from a position flush with the rear end of the vehicle and forward of the pickup truck rear bumper 310 to a new position which is aft of the rear of the vehicle and at least out to the pickup truck rear bumper top outside edge 312 of the bumper 310. If the handles 407 and 408 have been manipulated to permit free movement of the bottom of the tailgate, then the material in the box 100 can slide out through the gap between the free dump box tailgate bottom edge 402 and the bottom dump box rear edge 105 of the box 100. Because the length of the roll limiting slot 148 is limited, the box 100 extends enough to clear the pickup truck rear bumper 310, and thereby reduce problems associated with dumping on the bumper 310, but does not extend so far beyond the pickup truck rear bumper top outside, edge 312 of the bumper 310 that the dump box tailgate end 104 of the dump box 100 strikes the ground, thereby limiting the maximum dump angle which can be achieved. The necessary dump angle is a function of many factors, including the material in the box 100, and often its moisture content. For example, wet sand, damp dirt, or clay will often require a dump angle higher than would dry crushed rock.

Throughout this description, reference is made to a pickup truck, because it is believed that the beneficial aspects of the present invention would be most readily apparent when used in connection with pickup trucks; however, it should be understood that the present invention is not intended to be limited to pickup trucks and should be hereby construed to include flatbed trucks, trailers, vans, station wagons, sport utility vehicles, or any other non-pickup truck utility vehicle as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A system for removing material from a vehicle having a floor, and a rear bumper having a bumper thickness characteristic, the system comprising:

a plurality of rails running in a first direction, each of said rails having a roll limiting device thereon for limiting an extent of permissible roll to a stroke dimension at least as long as said bumper thickness characteristic and shorter than half of a first length dimension;

a dump box, having a cab end and a tailgate end, separated by said first length dimension and further having a plurality of rollers thereon for rolling on said rails;

a device for providing lifting forces on the dump box;

said dump box being pivotally coupled to each of said roll limiting devices;

a frame coupled to said rails to constitute a single unit which can be inserted into a bed of a pickup box;

wherein each of said roll limiting devices is a roller guide coupled to one of said plurality of rails, where each of the roller guides has a slot therein for receiving and limiting a travel dimension of one of said plurality of rollers.

2. A system of claim 1 wherein said device for providing lifting forces includes a pair of hydraulic powered pistons disposed on opposite sides of the dump box.

3. A system of claim 2, wherein the dump box has a bottom with an inside which is larger than a 4×8 sheet of plywood.

4. A system of claim 3 wherein said dump box has an outside dimension along an outside bottom surface which is smaller than an industry standard dimension between wheel humps in a rear of a pickup truck.

5. A system of claim wherein said dump box has side members having a thickness in a range of one sixteenth of an inch to one eighth inches.

6. A system of claim 5 wherein said thickness corresponds to 14-gauge sheet metal.

7. A system of claim 5 wherein a source of hydraulic power is disposed in a cargo area of said vehicle, between a side of said dump box and a side of said cargo area.

8. A system of claim 7 wherein one of said roll limiting devices is a pair of parallel plates disposed on opposite sides of one of said plurality of rails.

9. A system of claim 8 wherein said slot has a predetermined length at least as long as said bumper thickness characteristic.

10. A system of claim 9 wherein said dump box has a tailgate with a top edge and a bottom edge and said tailgate is alternatively pivotally coupled to said dump box along said top edge and said bottom edge.

11. A pickup truck accessory comprising:

a pivoting dump box, having a right side dump box wall, a left side dump box wall, a front side dump box wall, a planar box bottom, having a rectangular region therein which is in excess of 4 feet by 8 feet, and a tailgate disposed on an opposite end of said pivoting dump box with respect to said front side dump box wall, said tailgate alternatively pivotally coupled with said pivoting dump box, so that in one configuration a bottom edge of said tailgate is free to pivot away from said pivoting dump box, and in an alternate configuration, a top edge of said tailgate is free to pivot down to form a platform which lies in a plane defined by said planar box bottom;

a frame for coupling with a pickup truck, via bolts through holes in a bed of a pickup truck;

a pair of parallel rails, coupled to said frame, said rails running parallel with a length dimension of a bed of a pickup truck;

four rollers, coupled to comer regions of said pivoting dump box, each said roller disposed over one of said rails so as to permit said pivoting dump box to roll on said pair of rails;

a pair of parallel plates, disposed inside of a tailgate end of each of said pair of parallel rails, said pair of parallel plates each has a slot therein which forms a guide;

said guide for receiving therein one of said rollers attached to a rear portion of said pivoting dump box;

said guide further for limiting, to a predetermined protrusion distance, a distance of travel along said rails of said attached roller; and, a pair of hydraulic pistons coupled to said frame and to a right side of said pivoting dump box and a left side of said pivoting dump box, so that when said hydraulic pistons are caused to extend from a fully retracted configuration, the pivoting dump box first rolls on said rollers on said pair of rails until further rolling is prohibited by said pair of parallel plates, then further extension of said pair of hydraulic pistons results in a pivoting of said pivoting dump box around a pivoting axis formed by said pair of parallel plates.

* * * * *